C. ELLIS.
PROCESS OF PREPARING CATALYZERS AND APPARATUS THEREFOR.
APPLICATION FILED FEB. 15, 1913.
1,084,202. Patented Jan. 13, 1914.
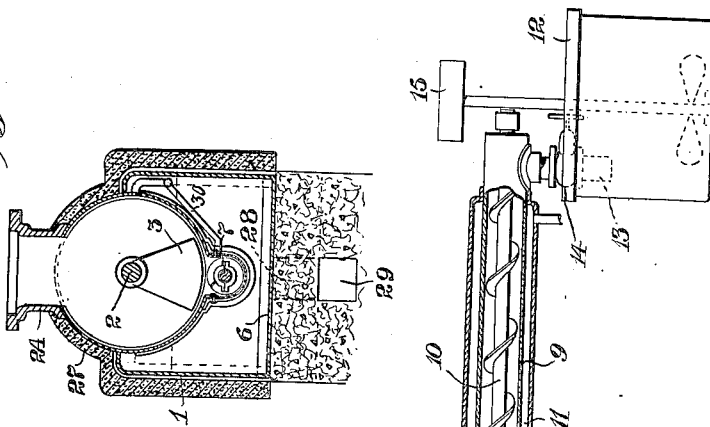
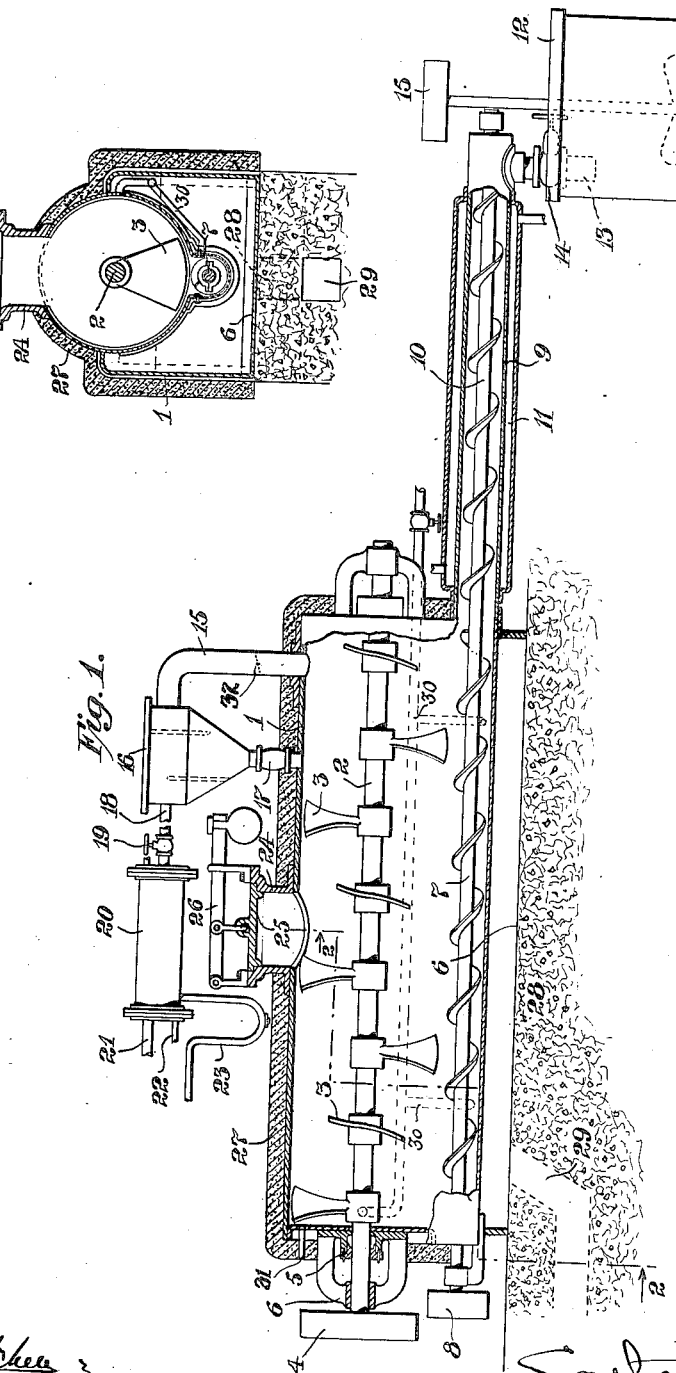

UNITED STATES PATENT OFFICE.

CARLETON ELLIS, OF MONTCLAIR, NEW JERSEY.

PROCESS OF PREPARING CATALYZERS AND APPARATUS THEREFOR.

1,084,202.  Specification of Letters Patent.  Patented Jan. 13, 1914.

Application filed February 15, 1913. Serial No. 748,532.

*To all whom it may concern:*

Be it known that I, CARLETON ELLIS, a citizen of the United States, and a resident of Montclair, in the county of Essex and State of New Jersey, have invented a certain new and useful Improvement in Processes of Preparing Catalyzers and Apparatus Therefor, of which the following is a specification.

This invention relates to a process of making catalyzers by the reduction of salts, oxids, etc., of various metallic bodies through the agency of hydrogen or other reducing element or material, and further relates to apparatus adapted for carrying out the aforesaid process.

The accompanying drawings depict such apparatus.

The drawings are diagrammatic and Figure 1 is a (chiefly) longitudinal section and Fig. 2 a cross section along the line 2—2 of Fig. 1.

Like reference characters denote like parts.

In the drawings 1 is a cylindrical treating chamber having the shaft 2 carrying the mixing blades 3, which shaft is equipped with the driving pulley 4.

5 is a special gas tight packing gland adapted to withstand a considerable degree of heat, and 6 is a bearing of any suitable type. This double bearing or bearing and gland arrangement finds its counterpart at the opposite end, but this is not shown in the drawing.

The lower part of the treating chamber is longitudinally recessed and herein is situated the conveyer 7 operated by the driving pulley 8 and arranged to rotate in a direction opposite to the direction of rotation of the shaft 2. An extension tube 9 is provided to carry an extended portion 10 of the conveyer 7. This tube is surrounded by the water jacket 11.

12 is a tank, preferably closed and into the upper part thereof depends the outlet 13 of the conveyer 10, which outlet or outlet pipe carries the valve 14.

15 designates stirring apparatus.

16 is a dust collector with return tube 17, so that dust may be collected and returned to the treating chamber, without access of air.

18 is a pipe carrying the valve 19 and connecting the dust chamber with the condenser 20.

21 is a continuation of the pipe 18 on the exit side of the condenser.

22 is a water inlet for admission of condensing water.

23 is a U tube or trap in which the aqueous condensate entering the condenser 20 in vapor form through the pipe 18, is removed and the rate of flow noted in order to control the operation of the apparatus.

24 is a manhole tubulation having the lid 25 fitting into substantially vapor and dust tight groovings of said tubulation, and weighted by the ever-and-weight 26.

27 is heat insulating jacketing.

29 is a flue for the admission of heated gases from a source of heat preferably kept at a distance from the treating chamber.

30 is a reducing gas inlet pipe with inlets at several points, one preferably being located above the charge and others being preferably situated near the bottom of the conveyer 7, so that the reducing gas may pass over as well as through the charge.

The operation is as follows:—A charge of catalyzer raw material, such as charcoal, iron oxid, or the oxids and the like of nickel, cobalt, copper, etc., is placed in the treating chamber 1 to fill same preferably to a point somewhat below the shaft 2 and the charge is heated by means of hot gases entered through the flue 29 into the heating jacket or housing about the treating chamber. A suitable temperature is usually from about 300° C. to 500° C. or so. By having the heating means, that is to say, the fire producing the hot gases, situated at a place remote from the treating apparatus, dangers from explosion due to ignition of the gases used for reduction, is minimized. I do not however limit myself to heating in this manner. When the charge is heated sufficiently hydrogen or other reducing gas, as marsh gas, or vapors, as gasolene, etc., is introduced by the line of pipe 30 and a portion passes over the top of the charge while another portion enters beneath the said charge. The conveyer 7 is rotated in a direction such that the charge is moved downwardly to some extent on the side where the hydrogen enters in the lower part of the conveyer.

While the conveyer 7 is propelling material along the bottom of the treating chamber in one direction, the mixing conveyer 2 by rotation in an opposite direction, moves the upper strata of material in a direction opposed to that of the travel of the material in the lower part of said chamber, and thus said material moves to and fro while being stirred and while the reducing medium penetrates through the mass and also circulates over the top thereof; which arrangement allows of thorough reduction in a very short time. While the rotation of the conveyers is preferably slow, the catalyzer material, if fine, creates some dust which is caught in the dust collector 16 and returned from time to time to the treating chamber. The valve 17 permits of this without introduction of air. Reduction of an oxid with hydrogen of course brings with it the formation of steam and this is condensed in 20 while the fixed gases depart at 21 and may be collected and used again, with suitable purification if necessary. A considerable pressure of hydrogen gas, water gas or other reducing medium may be maintained in the treating chamber, five or ten pounds pressure being useful under some circumstances. When reduction is completed to the desired extent, the material is discharged through the cooling conveyer, into the receptacle 12. This receptacle preferably is filled with oil to a level slightly above that in which the bottom of the depending discharge pipe lies. The mixer 15 is put in motion and serves to mingle the catalyzer and oil so as to form a catalyzer stock sealed in oil, in which form, although pyrophoric, the catalyzer may be transferred to the hydrogenating apparatus, if used for this purpose, and without loss of efficiency in spite of more or less exposure of the oily mass to air.

If desired the receptacle 12 may constitute an actual hydrogenating apparatus and thus the catalyzer discharges directly thereinto in such a case.

With pyrophoric catalyzers, great danger arises in opening the treating chamber under circumstances admitting air, as the catalyzer ignites and explodes the mixture of hydrogen or other reducing gases, and air. When this happens in apparatus of large size the results are disastrous. In order to open the apparatus with safety, a steam jet 31 is provided which enables all explosion-forming gases to be flushed out of the chamber. The raw catalyzer materials may be charged through the dust collector 16 so as to avoid introducing air into the treating chamber with each successive charging.

If desired the chamber 12 may be filled with hydrogen or other reducing gas and the oil dispensed with, or after the catalyzer has been collected in the chamber 12 oil may be added to flood the catalyzer material.

It should be stated that during the reducing operation, the conveyer 7 is rotated in a direction which prevents movement of the material into the cooling section and this direction is reversed to propel the material into the tank 12.

The present invention permits of preparing pyrophoric catalyzer in a state which enables its handling on the large scale without danger. This stable form is secured by incorporation of the catalyzer with oil or wax or hydrogenated fatty material preferably quite hard. The catalyzer may for example be mixed with just sufficient melted hydrogenated oil, preferably vegetable oil, to seal and cement or bond the particles of catalyzer into a solid mass such as blocks or cakes. When cold these if desired may be dipped momentarily into a bath of melted paraffin or ceresin and the like, to form an outer seal, and the catalyzer may be preserved or shipped in this condition; thus affording as a new article of manufacture a catalyzer normally pyrophoric but rendered factitiously stable through an incorporated sealing and bonding agent.

A catalyzer of the charcoal-nickel type comprising say one part of reduced nickel to four or five parts of charcoal of about 60-80 mesh and having the charcoal charged with occluded hydrogen (especially that derived by the supercharged product obtained by reduction under pressure of the reducing medium) has, when sealed as above, most excellent keeping qualities, as the store or magazines of hydrogen carried by the charcoal, tends to keep the mass under reducing conditions and serves as a protector for the easily-oxidized reduced metal. When vegetable or other hydrogenated oil is affected by the catalyzer causing formation of metal soaps, etc., the hydrogenated oil sealing and bonding agent may be replaced by paraffin wax or other inert sealing agent.

The present application contains matter disclosed in my copending application Serial No. 732,943.

To recapitulate, my invention comprises the process of heating and exposing to a reducing medium preferably under pressure, catalyzer raw material of a reducible character; in moving the material to and fro as by causing a body thereof in its lower part to be propelled in one direction and in its upper part to be propelled in a substantially opposite direction, in removing the gases and vapors of reduction, etc., in preferably separating the dust therefrom and separately condensing the condensable bodies or vapors (as water), and in removing the reduced catalyzer from the reducing receptacle without contact with air, in preferably cooling said material and immersing in oily, fatty or waxy sealing agents serving as vehicles for distribution to enable said catalyzer to be apportioned as desired in the hydrogenation or other treatment of unsaturated organic material, such as oily and fatty bodies; and my invention further comprises as apparatus for carrying out said process preferably a substantially cylindrical vessel preferably having in the lower part thereof a trough or conveyer channel carrying a conveyer adapted to propel material in either direction at will, superimposed thereto a mixing conveyer adapted to propel material in a direction opposite to that of the first mentioned conveyer, having means the first mentioned conveyer, having means for the introduction of a charge of raw catalyzer material preferably without introduction of air, means for heating the reducing chamber preferably by a distant source of heat, means for introducing a current of hydrogen or other reducing gas or vapor preferably preheated and entered above and below the main portion of the charge of catalyzer material, means for collecting dust arising from said charge during the gassing operation which means may permit of the return of the said dust to the treating chamber without access of air; means for cooling the gases and vapors also are preferably provided along with suitable means for condensing and removing water therefrom, and also the following preferred means:—a steam pipe entering the treating chamber for flushing out the reducing medium when the apparatus is to be opened, a safety manhole in the upper part of said treating chamber, a cooling conveyer as a part of or extension of a mixing conveyer, and adapted for the simultaneous removal and cooling of said charge and means for the substantially clean removal of the charge and its introduction into oil and the like all without material contact with air at least during the final reducing stages, and means for stirring such charge in said oil and the like.

What I claim is;—

1. An apparatus for preparing catalyzer comprising a substantially cylindrical reducing chamber having a stirring conveyer adapted to propel material in one direction, and superimposed on a secondary smaller conveying trough opening thereinto and containing a second conveyer adapted to propel material in a direction opposite to that of the superimposed mixing conveyer, means for admission of a charge without access of air, means for heating such charge to a reducing temperature, means for the introduction of preheated hydrogen gas under pressure above and substantially below the charge in said chamber, means for collecting dust arising from said charge and returning same to said chamber, means for cooling the exit gases and vapors and condensing water therefrom, means for the admission of steam for flushing said chamber, a safety manhole in the upper part of said chamber, a cooling conveyer adapted for the simultaneous removal and cooling of said charge, means for the introduction of said charge into oily material without oxidizing or substantial contact with air, and means for stirring such charge in said oily material.

2. An apparatus for reducing catalyzer material comprising a stationary reducing chamber, mixing devices therein, means for removal of steam formed by reduction and separation of same from suspended catalyzer dust, means for collecting the latter, and means for feeding the reduced charge into oil without material contact with air.

3. An apparatus for reducing catalyzer material comprising a stationary reducing chamber, mixing devices therein, means for removal of steam formed by reduction and separation of same from suspended catalyzer dust, means for collecting the latter, and means for returning same to said reducing chamber.

4. An apparatus for reducing catalyzer material comprising a stationary reducing chamber, mixing devices therein, means for the reduction of the raw material by hydrogen gas, means for the removal of steam formed by reduction, means for the collection of catalyzer dust and means for removal of the reduced charge.

5. The process of preparing catalyzer which comprises heating and exposing catalyzer raw material to a reducing medium while moving such material to and fro by propelling the lower layer thereof in one direction and the upper layer thereof in an opposite direction and in withdrawing the reduced material without contact with air, cooling same and transferring without material oxidation to the seat of consumption.

6. The process of preparing catalyzer which comprises heating and exposing catalyzer raw material of a reducible nature to a reducing gas while moving such material to and fro by repeatedly propelling the lower layer thereof in one direction and the upper layer thereof in an opposite direction and in cooling and transferring the reduced pyrophoric material without injurious oxidation to the seat of consumption.

7. The process of preparing catalyzer which comprises heating and exposing catalyzer raw material of a reducible nature to reducing gas while moving same to and fro, in arresting and collecting the dust arising from such movement and in returning the dust to the catalyzer material.

Signed at Montclair in the county of Essex and State of New Jersey this 13th day of February A. D. 1913.

CARLETON ELLIS.

Witnesses:
JOHN T. COX,
B. M. ELLIS.